US009084322B2

(12) United States Patent  (10) Patent No.: US 9,084,322 B2
Kumar et al.  (45) Date of Patent: Jul. 14, 2015

(54) BI-LEVEL CURRENT CONFIGURABLE DRIVER

(71) Applicants: Nitin Kumar, Beverly, MA (US); Markus Ziegler, Watertown, MA (US)

(72) Inventors: Nitin Kumar, Beverly, MA (US); Markus Ziegler, Watertown, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 0 days.

(21) Appl. No.: 14/312,919

(22) Filed: Jun. 24, 2014

(65) Prior Publication Data

US 2015/0042227 A1  Feb. 12, 2015

Related U.S. Application Data

(60) Provisional application No. 61/864,319, filed on Aug. 9, 2013.

(51) Int. Cl.
*H05B 33/08* (2006.01)
*H02M 3/24* (2006.01)

(52) U.S. Cl.
CPC .............. *H05B 33/0815* (2013.01); *H02M 3/24* (2013.01); *H05B 33/08* (2013.01)

(58) Field of Classification Search
CPC . H02M 3/156; H02M 1/4225; H02M 1/4258; H02M 1/44; H02M 3/33523; Y02B 20/186; Y02B 70/1433; Y02B 20/346; Y02B 20/347; Y02B 70/1441; H05B 33/0815; H05B 33/08; H05B 41/2828; H01J 29/003; H01J 2229/0015; H01J 29/867; H01T 13/05; H04N 3/185

USPC ............ 315/85, 247, 291; 363/18–21, 39, 49, 363/56, 97; 323/228, 269, 270, 273–275, 323/282–285
See application file for complete search history.

(56) References Cited

U.S. PATENT DOCUMENTS

| 4,975,823 | A  | * | 12/1990 | Rilly et al. ................. 363/21.16 |
| 6,304,462 | B1 | * | 10/2001 | Balakrishnan et al. ..... 363/21.01 |
| 6,940,189 | B2 | * | 9/2005  | Gizara ......................... 307/151 |
| 7,126,387 | B2 | * | 10/2006 | Nair ............................. 327/108 |
| 7,372,241 | B1 | * | 5/2008  | Tomiyoshi .................... 323/288 |
| 8,791,674 | B2 | * | 7/2014  | Moane .......................... 323/275 |
| 8,842,450 | B2 | * | 9/2014  | Jungreis et al. ............. 363/21.03 |
| 2006/0220625 | A1 | * | 10/2006 | Chapuis ...................... 323/282 |
| 2010/0079127 | A1 | * | 4/2010  | Grant .......................... 323/285 |

* cited by examiner

*Primary Examiner* — Vibol Tan
(74) *Attorney, Agent, or Firm* — Shaun P. Montana

(57) ABSTRACT

A bi-level current configurable driver is provided. The driver includes a feedback circuit, a driver circuit providing a driver signal to a half bridge inverter, and a step-dim interface coupled to a first alternating current input line, a second alternating current input line, and a neutral line, providing voltage to the driver circuit. The driver also includes a first feedforward circuit coupled to the step-dim interface, where the first feedforward circuit receives a first signal from the step-dim interface based on the states of the first alternating current input line, the second alternating current input line, and the neutral line. In a first state, the driver provides full current to a load, and in a second state, the driver provides less than full current to the load.

18 Claims, 4 Drawing Sheets

BI-LEVEL CURRENT CONFIGURABLE DRIVER

CROSS-REFERENCE TO RELATED APPLICATION

The present application claims priority of U.S. Provisional Patent Application No. 61/864,319, entitled "DRIVER FOR SOLID STATE LIGHT SOURCES", filed on Aug. 9, 2013, the entire contents of which are hereby incorporated by reference.

TECHNICAL FIELD

The present invention relates to lighting, and more specifically, to drivers for solid state light sources.

BACKGROUND

Solid state light sources, such as but not limited to light emitting diodes (LEDs) and other semiconductor-based light sources, require a constant direct current (DC) voltage or current to operate optimally. During operation, the light source must be protected from line-voltage fluctuations. Changes in voltage can produce a disproportional change in current, which in turn can cause light output to vary, as solid state light source light output is proportional to current and is rated for a current range. If current exceeds the manufacturer recommendations, the output of the solid state light sources can become brighter, but that output can degrade at a faster rate due to higher temperatures within the device, which leads to a shorter useful life.

Solid state light sources, therefore, require a driver (also referred to as a driver circuit and/or a power supply) that converts incoming alternating current (AC) power to the proper DC voltage, and regulates the current flowing through the light sources during operation. The driver converts 120V (or other voltages) 60 Hz AC power to DC power required by the light sources, and protects the light sources from line-voltage fluctuations.

Drivers can enable dimming of solid state light sources via, for example, preset commands, occupant presence, or other controls. Drivers with dimming capability can dim the light output over the full range from one hundred percent to zero percent. Dimming drivers can dim solid state light sources by, for example, reducing the forward current, pulse width modulation (PWM) via digital control, or more sophisticated methods. Most dimming drivers operate using the PWM method. With this method, the frequency could range from a hundred modulations per second to as high as hundreds of thousands of modulations per second, so that the solid state light source appears to a human eye to be continuously lighted without flicker. A benefit of the PWM method of dimming is that it enables dimming with minimal color shift in the light source output. Dimming does not result in a loss of efficiency. During dimming, the solid state light sources are still operated at the same voltage and current as during full light output. In addition, life of a lighting device including the solid state light sources is not affected by dimming, as is sometimes the case with frequently dimmed fluorescent lamps. Rather, dimming solid state light sources may lengthen their useful life, because dimming can reduce operating temperatures inside the light source.

SUMMARY

Embodiments provide a bi-level current configurable driver for solid state light sources. The user has the option to set the output current via an isolated external resistor. The driver may be, and in some embodiments is, also used to dim the solid state light sources to less than the full load drive current when run in step-dim mode configuration, for example but not limited to 50% of its full load drive current. This is useful for providing flexibility in design and in the field where a single hardware version can be used for multiple configurations that require different operating currents.

In an embodiment, there is provided a bi-level current configurable driver. The bi-level current configurable driver includes: a driver circuit; a regulator circuit; a feedback circuit; a resistor divider comprising an upper resistor and a lower resistor, the resistor divider determining a reference current provided by the regulator circuit, wherein the upper resistor has a first lead connected to a voltage and a second lead connected to a first input of the regulator circuit, and wherein the lower resistor has a first lead connected to a ground and a second lead connected to the second lead of the upper resistor and the first input of the regulator circuit; and an external resistor coupled in parallel to the first input of the regulator circuit, wherein changing a value of the external resistor changes a value of the reference current.

In a related embodiment, the external resistor may be connected in parallel with the lower resistor. In another related embodiment, the external resistor may be connected in parallel with the upper resistor. In still another related embodiment, the driver circuit may include a constant current constant voltage (CCCV) regulator. In a further related embodiment, the bi-level current configurable driver may further include a step-dim circuit coupled between the regulator circuit and a load including one or more solid state light sources. In a further related embodiment, the step-dim circuit may include a first resistor connected in series between the load and a second input of the regulator circuit, a second resistor having a first end connected to the second input of the regulator circuit, a transistor having a source connected to a second end of the second resistor, a drain connected to the ground, and a gate connected to an output of a feedforward optocoupler, wherein when the transistor is off, the second input of the regulator circuit may see a full sense voltage and the driver circuit may provide full current at an output, and wherein when the transistor is on, the second input of the regulator circuit may see half of the sense voltage and may provide a reduced amount of current at an output. In another further related embodiment, an output of the regulator circuit may provide feedback to a primary side of the driver circuit.

In another embodiment, there is provided a step-dim circuit for a power supply. The step-dim circuit for a power supply includes: a feedback circuit coupled to an output of the power supply; a driver circuit receiving an output of the feedback circuit, the driver circuit providing a driver signal to a half bridge inverter of the power supply; a step-dim interface coupled to a first alternating current (AC) input line, a second AC input line, and a neutral line providing voltage to the power supply; and a first feedforward circuit coupled to the step-dim interface, wherein the first feedforward circuit receives a first signal from the step-dim interface based on the states of the first AC input line, the second AC input line, and the neutral line, and wherein the first feedforward circuit provides a second signal to the feedback circuit, the feedback circuit providing a feedback signal to the driver circuit, wherein when the feedback signal is in a first state, the power supply provides full current to a load, and when the feedback signal is in a second state, the power supply provides less than full current to the load.

In a related embodiment, when the first AC input line, the second AC input line, and the neutral line are all on, the power supply may provide full current to the load. In another related embodiment, when the first AC input line is off, the second AC input line is on, and the neutral line is on, the power supply may provide a second amount of current to the load, the second amount of current less than the full amount of current. In still another related embodiment, when the first AC input line is on, the second AC input line is off, and the neutral line is on, the power supply may provide a second amount of current to the load, the second amount of current less than the full amount of current. In yet another related embodiment, when the first AC input line, the second AC input line, and the neutral line are all off, the power supply may provide no current to the load.

In still yet another related embodiment, the step-dim circuit for a power supply may further include a second feedforward circuit coupled to the step-dim interface, wherein the second feedforward circuit may receive a first signal from the step-dim interface based on the states of the first AC input line, the second AC input line, and the neutral line, and wherein the second feedforward circuit may provide a third signal to the feedback circuit. In a further related embodiment, when the first AC input line, the second AC input line, and the neutral are all on, the power supply may provide full current to the load. In another further related embodiment, when the first AC input line is off, the second AC input line is on, and the neutral line is on, the power supply may provide a second amount of current to the load, the second amount of current less than the full amount of current. In still another further related embodiment, when the first AC input line is on, the second AC input line is off, and the neutral line is on, the power supply may provide a third amount of current to the load, the third amount of current less than the second amount of current. In yet another further related embodiment, when the first AC input line, the second AC input line, and the neutral line are all off, the power supply may provide no current to the load.

In another embodiment, there is provided a driver circuit. The driver circuit includes: an EMI front end coupled to a first alternating current (AC) line, a second AC line, and a neutral line, the EMI front end providing a rectified direct current (DC) voltage; a boost PFC circuit coupled to the EMI front end, the boost PFC providing a boosted voltage; an inverter coupled to the boost PFC circuit; an isolation transformer having a primary side coupled to the inverter; a rectifier coupled to a secondary side of the isolation transformer; an output filter coupled to the rectifier, an output of the rectifier capable of driving a load; a feedback circuit coupled to the load and providing an output of the driver circuit; a step-dim interface coupled to a first AC line, a second AC line, and a neutral line; and a first feedforward driver receiving an output from the step-dim interface and providing a signal to the feedback circuit.

In a related embodiment, when the first AC line, the second AC line, and the neutral line are all on, the driver circuit may provide full current to the load, and wherein when the first AC line is off, the second AC line is on, and the neutral line is on, the driver circuit may provide a second amount of current to the load, the second amount of current less than the full amount of current, and wherein when the first AC line is on, the second AC line is off, and the neutral line is on, the driver circuit may provide a second amount of current to the load, the second amount of current less than the full amount of current, and wherein when the first AC line, the second AC line, and the neutral line are all off, the driver circuit may provide no current to the load. In another related embodiment, the driver circuit may further include a second feedforward circuit coupled to the step-dim interface, wherein the second feedforward circuit may receive a first signal from the step-dim interface based on the states of the first AC line, the second AC line, and the neutral line, wherein the second feedforward circuit may provide a third signal to the feedback circuit, and wherein when the first AC line, the second AC line, and the neutral line are all on, the driver circuit may provide full current to the load, wherein when the first AC line is off, the second AC line is on, and the neutral line is on, the driver circuit may provide a second amount of current to the load, the second amount of current less than the full amount of current, wherein when the first AC line is on, the second AC line is off, and the neutral line is on, the driver circuit may provide a third amount of current to the load, the third amount of current less than the second amount of current, and wherein when the first AC line, the second AC line, and the neutral line are all off, the driver circuit may provide no current to the load.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
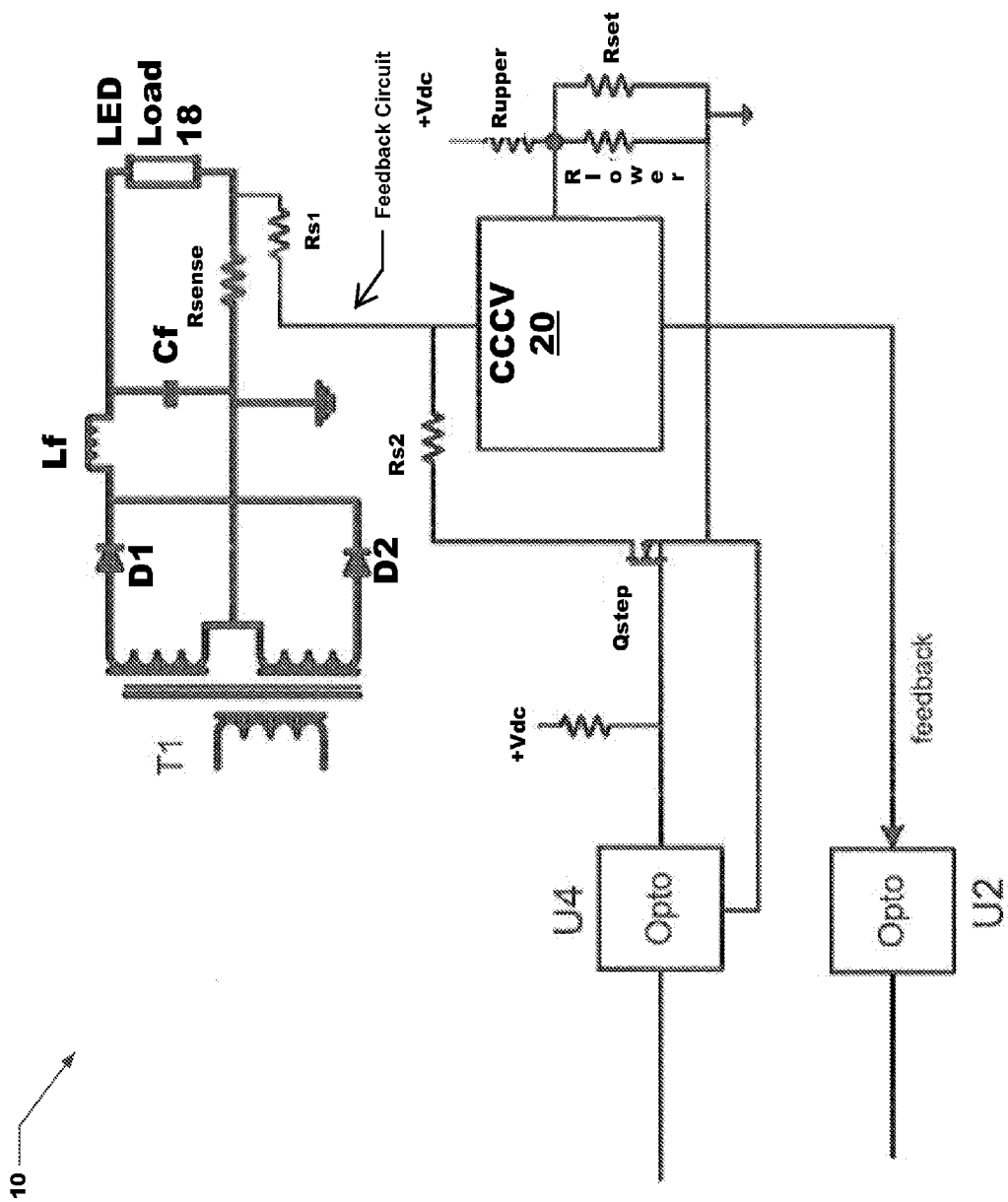
FIG. 1 depicts a schematic diagram of a first circuit used to set an output current of a power supply by way of an external resistor according to embodiments disclosed herein.

Embodiments presented herein are based on an inductor capacitor (LCC) based resonant converter topology. The regulation of current is achieved through frequency modulation of the LCC tank. Referring to FIG. 1, a portion of a driver 10 is shown. The output of an LCC tank (not shown) is provided to a primary side of an isolation transformer $T_1$. The isolation transformer $T_1$ is used for isolation, and could provide a step up voltage, a step down voltage, or reflect the input voltage at the same level. The output of the isolation transformer $T_1$ is followed by a rectifier comprising a diode $D_1$ and a diode $D_2$, which are followed by an LC filter comprising an inductor $L_f$ and a capacitor $C_f$. The current from the LC filter is then provided to an LED load 18, which includes one or more solid state light sources (not necessarily limited to light emitting diodes).

An external resistor Rset is used to set the current of the driver 10 within a specified current range. This is used to provide flexibility in design and in the field where a single hardware version can be used for multiple configurations that require different operating currents. A constant-voltage, constant-current (CCCV) regulator 20 has an adjustable reference for a current loop. This fact is taken advantage in using the "Rset" interface. A resistive divider determines the reference for the current. The nominal value is determined by resistors Rupper and Rlower. The external resistor Rset is connected in parallel with the resistor Rlower (or alternately the resistor Rupper), thereby changing the value of the current reference. The value of the external resistor Rset thereby determines the constant current provided by the CCCV regulator 20. Different values of the external resistor Rset result in different currents provided to the LED load 18, thereby permitting a single circuit design to provide a variety of current values for multiple different scenarios and/or loads.

The circuit of FIG. 1, in some embodiments, is further used for providing a step-dim function. To utilize the "on" signal for current reduction, a sense network in the current loop has been modified. Two equal value resistors (e.g., 25 k ohms each) RS1 and RS2 are connected in series across a low value sense resistor Rsense. The common point of the resistors RS1 and RS2 is connected a feedback pin (CC−) of the CCCV regulator 20. The other end of the resistor RS1 is connected to the sense resistor Rsense, while the other end of the resistor RS2 is connected to a source of a transistor Qstep. A gate of the transistor Qstep is connected to ground, as is a drain of the transistor Qstep. When the transistor Qstep is off, the full sense voltage is seen by the CCCV regulator 20. When the transistor Qstep is on, a path through the transistor Qstep to ground is provided. When the transistor Qstep is on, the resistors RS1 and RS2 act as a voltage divider and only half of the sense voltage is seen by the CCCV regulator 20 as feedback. In other words, for the same current reference, the actual current is doubled when the transistor Qstep is on, than when it is off.

Figure 2:
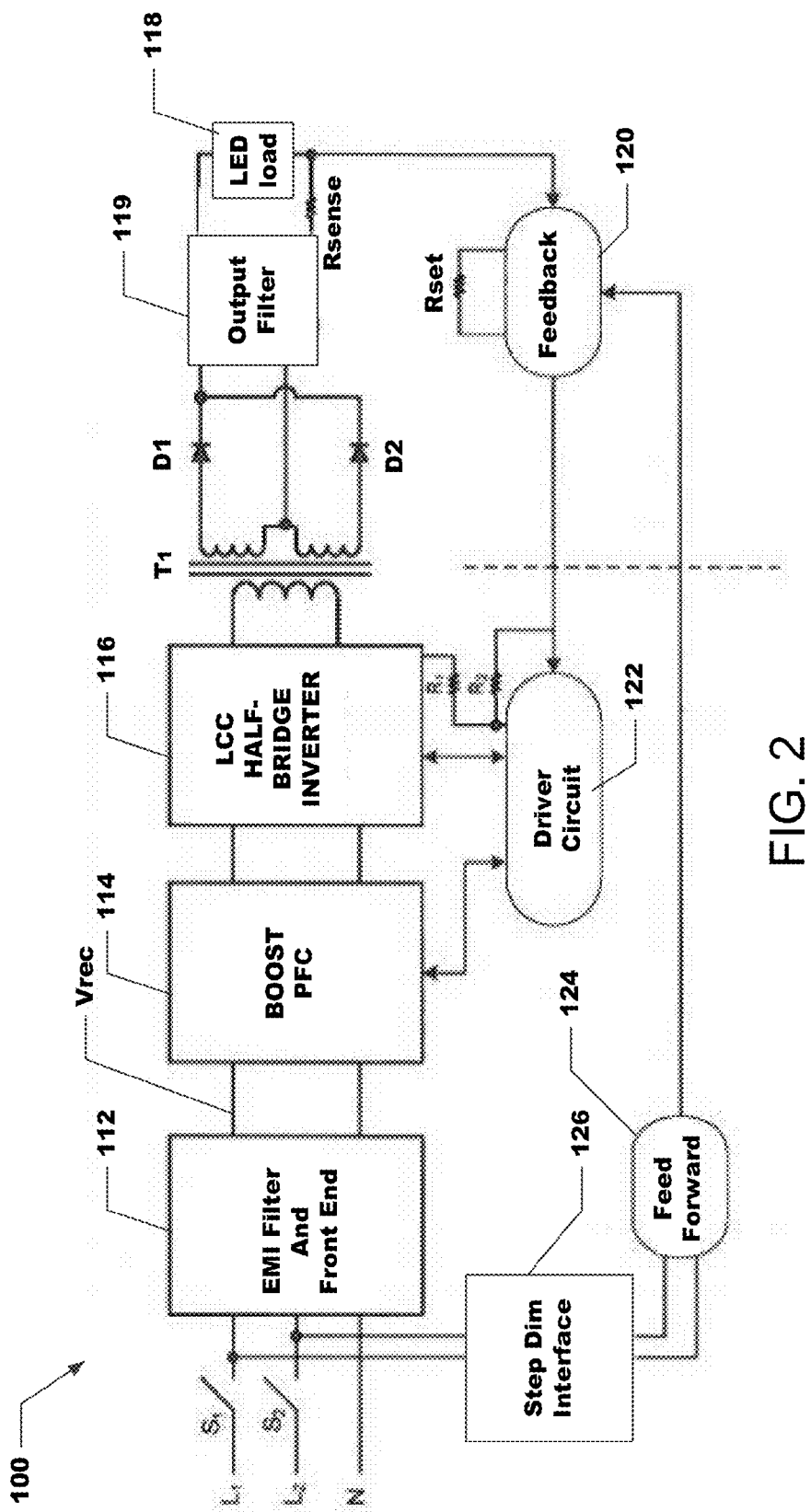
FIG. 2 depicts a schematic diagram of a first circuit used to provide a step-dim interface for a power supply according to embodiments disclosed herein.

Referring now to FIG. 2, an embodiment of a step-dim driver 100 is shown. The essential function of a step-dim interface is to reduce output current by half based on a selective input configuration on the line, while transferring and utilizing this information on the secondary side where the actual current control loop resides. A step-dim interface on an input side works by detecting the differential signal between two hot lines. If only one of them is connected, the step-dim interface produces a "high" signal.

The step-dim driver 100 includes two alternating current (AC) input lines $L_1$ and $L_2$, and a neutral line N. With both the AC input lines $L_1$ and $L_2$ on, and with the neutral line N on, one hundred percent light output is provided to an LED load 118 (which, similar to the LED load 18 of FIG. 1, is not necessarily limited to light emitting diodes, but may and does in some embodiments include any type of solid state light source(s)). If the AC input line $L_1$ is off, and the AC input line $L_2$ is on, a reduced amount (e.g., fifty percent) of light output is provided by the LED load 118. If the AC input line $L_2$ is off, and the AC input line $L_1$ is on, a reduced amount of light output is provided by the LED load 118. With both the AC input lines $L_1$ and $L_2$ off, and with the neutral line N also off, zero percent light output is provided by the LED load 118.

The AC voltage from the AC input lines $L_1$ and $L_2$ along with the neutral line N is provided to an EMI filter and front end and rectifier 112, which provides a rectified DC voltage $V_{REC}$. This rectified DC voltage $V_{REC}$ is provided to a boost PFC circuit 114, which outputs a boosted voltage (e.g., 450 volts DC). This boosted DC voltage is fed into an inverter 116, which includes a resonant network with an LCC tank circuit. The output of the inverter 116 is then provided to a primary side of an isolation transformer $T_1$. The isolation transformer $T_1$ is used for isolation, and could provide a step up voltage, a step down voltage, or reflect the input voltage at the same level.

The output of the isolation transformer $T_1$ is followed by a rectifier comprising diodes $D_1$ and $D_2$, which is followed by an output filter 119. The current from the output filter 119 is then provided to the LED load 118. All of the above described circuitry is driven by an application specific integrated circuit (ASIC) 122, also referred to herein as a driver circuit 122. The driver circuit 122 comprises a constant current constant coltage (CCCV) regulator and is used to set the current to a certain value and sets the output voltage to a certain value. The driver circuit 122 provides the gate drive for the boost PFC circuit 114 and the gate drive for the inverter 116. The driver circuit 122 also provides additional functionality, such as but not limited to protection.

Feedback from an optocoupler 120 on the secondary side of the transformer T1 is used. The optocoupler 120 provides isolation and is less expensive than an additional transformer. The constant current-constant voltage regulator of the driver circuit 122 is used for modulation and providing feedback through the optocoupler 120. The driver circuit 122 normally operates in constant current mode and a voltage loop is present to limit the output voltage in abnormal/fault conditions. For step-dimming functions, in some embodiments, the circuit 100 is initially running at one hundred percent. A step-dim interface 126 is connected to the AC input lines $L_1$ and $L_2$ and the neutral line N on its input. The step-dim interface 126 provides an output to a feedforward optocoupler 124. The feedforward optocoupler 124 has an output connected to the feedback optocoupler 120. When the step-dim interface 126 determines there is a need to provide a dimming function, the feedforward optocoupler 124 provides a signal to the feedback optocoupler 120 to reduce the current by a certain amount (e.g., one half). The feedback optocoupler 120 will add another resistor (not shown) in parallel to a set resistor Rset, which will configure the current to fifty percent of its original value. The frequency provided by the driver circuit 122 to the half bridge inverter 116 will thus be bumped up. The higher the frequency to the half bridge inverter 116, the lower the current to the LED load 118. Accordingly, when the AC input lines $L_1$ and $L_2$ are both on, the step-dim driver 100 operates at maximum current. When either one (but not both) of the AC input lines $L_1$ or $L_2$ are on, the step-dim driver 100 operates at a reduced current (e.g., fifty percent). When both of the AC input lines $L_1$ and $L_2$ are off, the step-dim driver 100 produces zero current.

Figure 3:
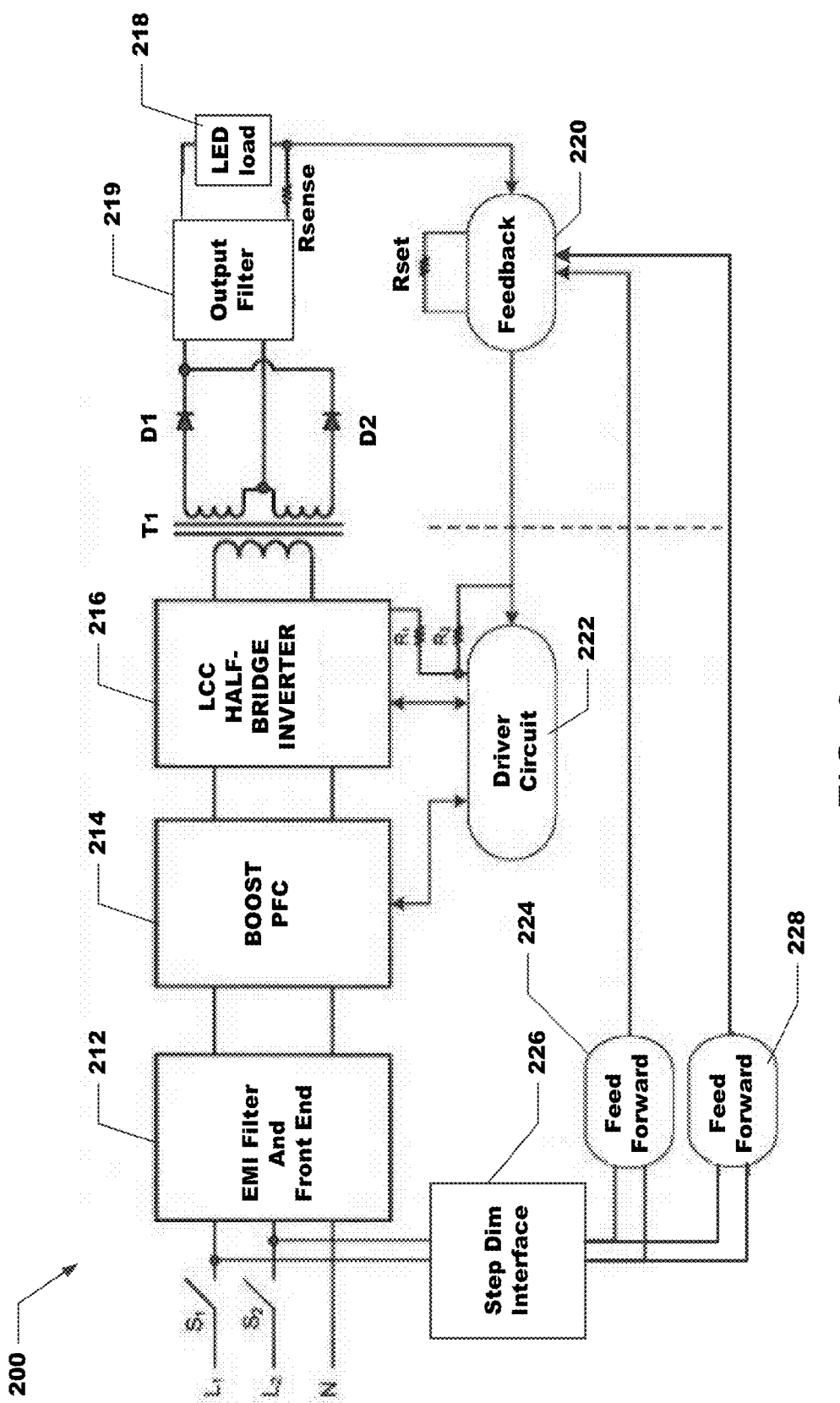
FIG. 3 depicts a schematic diagram of a second circuit used to provide a step-dim interface for a power supply according to embodiments disclosed herein.

Referring now to FIG. 3, a further embodiment of a step-dim circuit 200 is shown. In this embodiment, two feedforward circuits 224 and 228 are used instead of one (shown in FIG. 2). A step-dim interface 226 on the input side works by detecting the differential signal between the two AC input lines $L_1$ and $L_2$ and, dependent on which ones are on, provides a signal to feedforward circuits 224 and 228.

For step-dimming functions, assume the step-dim circuit 200 is initially running at 100%. The step-dim interface 226 is connected between the AC input lines $L_1$ and $L_2$ and a neutral line N, and a first feedforward optocoupler 224 and a second feedforward optocoupler 228. Both feedforward optocouplers 224 and 228 have an output connected to a feedback circuit 220. When the step-dim interface 226 determines there is a need to provide a dimming function, the feedforward optocouplers 224 and/or 226 provides a signal to the feedback circuit 220 to reduce the current by a certain amount. The feedback circuit 220 will add in a resistance in parallel to a set resistor Rset, which will configure the current to a certain percentage of its original value. The frequency provided by a driver circuit 222 to the half bridge inverter 216 will be bumped up. The higher the frequency to the half bridge inverter 216, the lower the current to an LED load 218 (which, like the LED load 118 of FIG. 2, is not necessarily limited to light emitting diodes). Accordingly, when the AC input lines $L_1$ and $L_2$ are both on, the step-dim circuit 200 operates at maximum current. When the AC input line $L_1$ is on and the AC input line $L_2$ is off, the step-dim circuit 200 operates at a reduced current (e.g., sixty percent). When the AC input line $L_1$ is off and the AC input line $L_2$ is on, the step-dim circuit 200 operates at a further reduced current (e.g., thirty percent). When both the AC input lines $L_1$ and $L_2$ are off, the step-dim circuit 200 produces zero current.

Figure 4:
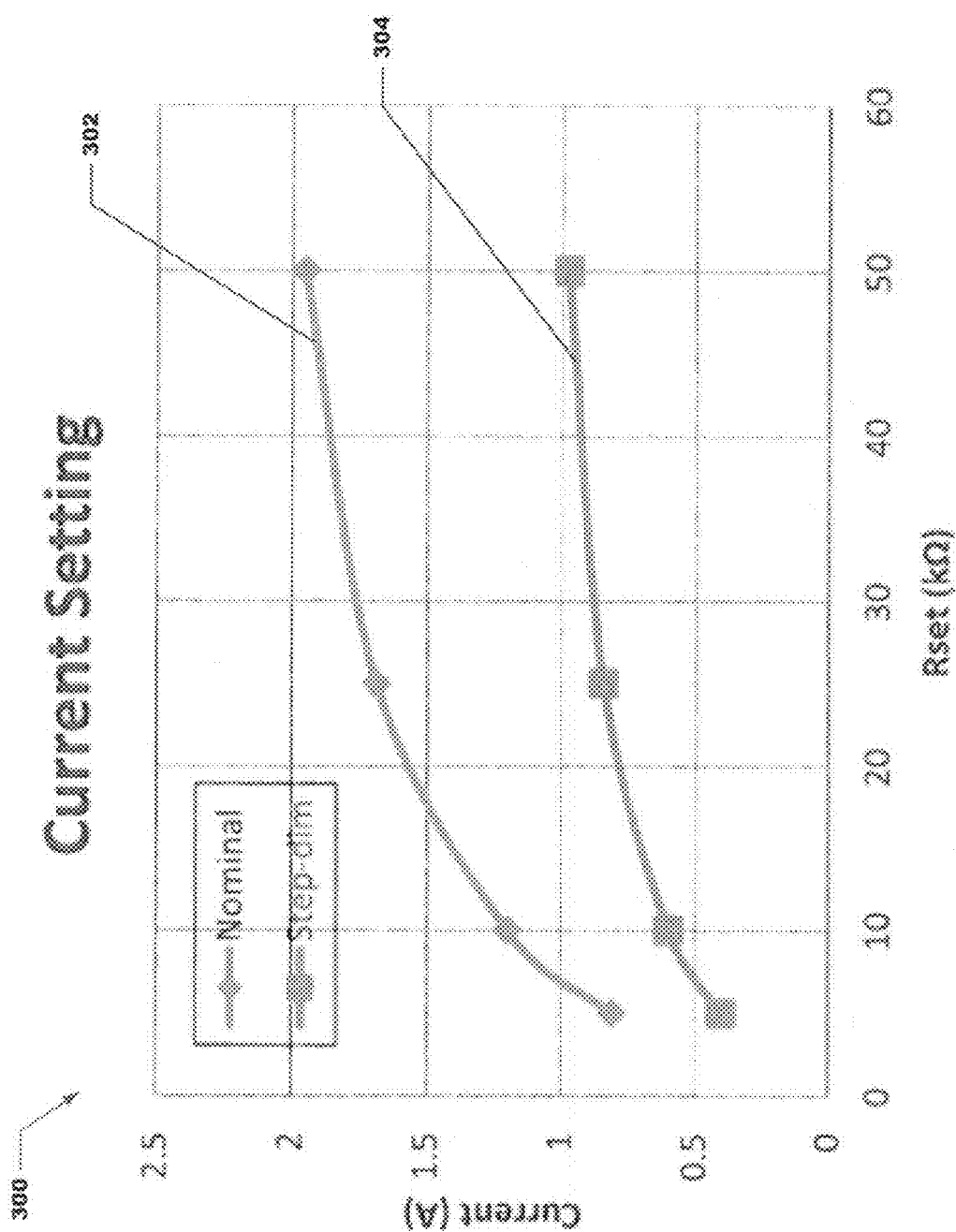
FIG. 4 depicts a graph of current versus resistance for a power supply according to embodiments disclosed herein.

FIG. 4 shows a graph 300 with a horizontal axis showing resistance in kiloohms for values of the set resistor Rset of FIGS. 2 and 3, and a vertical axis showing current in amps for the output of a driver circuit. A first line 302 shows the relationship of the nominal current (full value) dependent upon the Rset resistance. Also shown is the relationship of the step-dim current dependent upon the Rset resistance. The step-dim current is generally half the value of the nominal current for the various resistances of Rset.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer (s), workstation(s) (e.g., Sun, HP), personal digital assistant (s) (PDA(s)), handheld device(s) such as cellular telephone(s) or smart cellphone(s), laptop(s), handheld computer(s), or another device(s) capable of being integrated with a processor (s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A bi-level current configurable driver comprising:
   a driver circuit;
   a regulator circuit;
   a feedback circuit;

a resistor divider comprising an upper resistor and a lower resistor, the resistor divider determining a reference current provided by the regulator circuit, wherein the upper resistor has a first lead connected to a voltage and a second lead connected to a first input of the regulator circuit, and wherein the lower resistor has a first lead connected to a ground and a second lead connected to the second lead of the upper resistor and the first input of the regulator circuit; and an external resistor coupled in parallel to the first input of the regulator circuit, wherein changing a value of the external resistor changes a value of the reference current;

wherein the driver circuit comprises a constant current constant voltage (CCCV) regulator, and wherein the driver further comprises a step-dim circuit coupled between the regulator circuit and a load comprising one or more solid state light sources.

2. The bi-level current configurable driver of claim 1, wherein the external resistor is connected in parallel with the lower resistor.

3. The bi-level current configurable driver of claim 1, wherein the external resistor is connected in parallel with the upper resistor.

4. The bi-level current configurable driver of claim 1, wherein the step-dim circuit comprises:
    a first resistor connected in series between the load and a second input of the regulator circuit;
    a second resistor having a first end connected to the second input of the regulator circuit;
    a transistor having a source connected to a second end of the second resistor, a drain connected to the ground, and a gate connected to an output of a feedforward optocoupler;
    wherein when the transistor is off, the second input of the regulator circuit sees a full sense voltage and the driver circuit provides full current at an output; and
    wherein when the transistor is on, the second input of the regulator circuit sees half of the sense voltage and provides a reduced amount of current at an output.

5. The bi-level current configurable driver of claim 1, wherein an output of the regulator circuit provides feedback to a primary side of the driver circuit.

6. A step-dim circuit for a power supply, comprising:
    a feedback circuit coupled to an output of the power supply;
    a driver circuit receiving an output of the feedback circuit, the driver circuit providing a driver signal to a half bridge inverter of the power supply;
    a step-dim interface coupled to a first alternating current (AC) input line, a second AC input line, and a neutral line providing voltage to the power supply; and
    a first feedforward circuit coupled to the step-dim interface, wherein the first feedforward circuit receives a first signal from the step-dim interface based on the states of the first AC input line, the second AC input line, and the neutral line, and wherein the first feedforward circuit provides a second signal to the feedback circuit, the feedback circuit providing a feedback signal to the driver circuit, wherein when the feedback signal is in a first state, the power supply provides full current to a load, and when the feedback signal is in a second state, the power supply provides less than full current to the load.

7. The step-dim circuit for a power supply of claim 6, wherein when the first AC input line, the second AC input line, and the neutral line are all on, the power supply provides full current to the load.

8. The step-dim circuit for a power supply of claim 6, wherein when the first AC input line is off, the second AC input line is on, and the neutral line is on, the power supply provides a second amount of current to the load, the second amount of current less than the full amount of current.

9. The step-dim circuit for a power supply of claim 6, wherein when the first AC input line is on, the second AC input line is off, and the neutral line is on, the power supply provides a second amount of current to the load, the second amount of current less than the full amount of current.

10. The step-dim circuit for a power supply of claim 6, wherein when the first AC input line, the second AC input line, and the neutral line are all off, the power supply provides no current to the load.

11. The step-dim circuit for a power supply of claim 6, further comprising a second feedforward circuit coupled to the step-dim interface, wherein the second feedforward circuit receives a first signal from the step-dim interface based on the states of the first AC input line, the second AC input line, and the neutral line, and wherein the second feedforward circuit provides a third signal to the feedback circuit.

12. The step-dim circuit for a power supply of claim 11, wherein when the first AC input line, the second AC input line, and the neutral are all on, the power supply provides full current to the load.

13. The step-dim circuit for a power supply of claim 11, wherein when the first AC input line is off, the second AC input line is on, and the neutral line is on, the power supply provides a second amount of current to the load, the second amount of current less than the full amount of current.

14. The step-dim circuit for a power supply of claim 11, wherein when the first AC input line is on, the second AC input line is off, and the neutral line is on, the power supply provides a third amount of current to the load, the third amount of current less than the second amount of current.

15. The step-dim circuit for a power supply of claim 11, wherein when the first AC input line, the second AC input line, and the neutral line are all off, the power supply provides no current to the load.

16. A driver circuit comprising:
    an EMI front end coupled to a first alternating current (AC) line, a second AC line, and a neutral line, the EMI front end providing a rectified direct current (DC) voltage;
    a boost PFC circuit coupled to the EMI front end, the boost PFC providing a boosted voltage;
    an inverter coupled to the boost PFC circuit;
    an isolation transformer having a primary side coupled to the inverter;
    a rectifier coupled to a secondary side of the isolation transformer;
    an output filter coupled to the rectifier, an output of the rectifier capable of driving a load;
    a feedback circuit coupled to the load and providing an output of the driver circuit;
    a step-dim interface coupled to a first AC line, a second AC line, and a neutral line; and
    a first feedforward driver receiving an output from the step-dim interface and providing a signal to the feedback circuit.

17. The driver circuit of claim 16, wherein when the first AC line, the second AC line, and the neutral line are all on, the driver circuit provides full current to the load, and wherein when the first AC line is off, the second AC line is on, and the neutral line is on, the driver circuit provides a second amount of current to the load, the second amount of current less than the full amount of current, and wherein when the first AC line is on, the second AC line is off, and the neutral line is on, the driver circuit provides a second amount of current to the load, the second amount of current less than the full amount of current, and wherein when the first AC line, the second AC line, and the neutral line are all off, the driver circuit provides no current to the load.

18. The driver circuit of claim 16, further comprising a second feedforward circuit coupled to the step-dim interface, wherein the second feedforward circuit receives a first signal from the step-dim interface based on the states of the first AC line, the second AC line, and the neutral line, wherein the second feedforward circuit provides a third signal to the feedback circuit, and wherein when the first AC line, the second AC line, and the neutral line are all on, the driver circuit provides full current to the load, wherein when the first AC line is off, the second AC line is on, and the neutral line is on, the driver circuit provides a second amount of current to the load, the second amount of current less than the full amount of current, wherein when the first AC line is on, the second AC line is off, and the neutral line is on, the driver circuit provides a third amount of current to the load, the third amount of current less than the second amount of current, and wherein when the first AC line, the second AC line, and the neutral line are all off, the driver circuit provides no current to the load.

* * * * *